(12) United States Patent
Morgan et al.

(10) Patent No.: US 9,094,313 B2
(45) Date of Patent: Jul. 28, 2015

(54) DATA AND MEDIA ACCESS CONTROLLER (MAC) THROUGHPUTS

(75) Inventors: Douglas S. Morgan, Plano, TX (US); Matthew W. Turlington, Richardson, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 290 days.

(21) Appl. No.: 13/611,061

(22) Filed: Sep. 12, 2012

(65) Prior Publication Data

US 2014/0071984 A1   Mar. 13, 2014

(51) Int. Cl.
*G01R 31/08*   (2006.01)
*H04L 12/26*   (2006.01)
*H04L 12/46*   (2006.01)

(52) U.S. Cl.
CPC ........ *H04L 43/0888* (2013.01); *H04L 12/4641* (2013.01); *H04L 43/08* (2013.01); *H04L 43/04* (2013.01); *H04L 43/50* (2013.01)

(58) Field of Classification Search
None
See application file for complete search history.

(56) References Cited

U.S. PATENT DOCUMENTS

| | | | |
|---|---|---|---|
| 2005/0128946 A1* | 6/2005 | Murakami et al. | 370/230 |
| 2005/0276230 A1* | 12/2005 | Akahane et al. | 370/252 |
| 2006/0083511 A1* | 4/2006 | Edmunds et al. | 398/25 |
| 2009/0086651 A1* | 4/2009 | Luft et al. | 370/253 |
| 2009/0232005 A1* | 9/2009 | Mohan et al. | 370/241.1 |
| 2011/0179342 A1* | 7/2011 | Kim | 714/807 |
| 2012/0218896 A1* | 8/2012 | Ygberg et al. | 370/235 |

* cited by examiner

*Primary Examiner* — Bob Phunkulh (57) ABSTRACT

A device may receive a request, from a client, to obtain throughput statistics for Ethernet frames transmitted under a given set of constraints; send a request to collect data about the Ethernet frames to a network element; receive the collected data from the network element in response to the request; determine Ethernet frame statistics based on the collected data; and forward the collected data, the Ethernet frame statistics, and predetermined Ethernet frame information to the client.

20 Claims, 12 Drawing Sheets

| TIME/DURATION 802 | 804-1 | 804-2 | 804-3 | 804-4 | 804-5 | 804-6 | 804-7 | 804-8 | 804-9 | 804-10 |
|---|---|---|---|---|---|---|---|---|---|---|
| MINIMUM INTERFRAME GAP 810-1 | 12 | 12 | 12 | 12 | 12 | 12 | 12 | 12 | 12 | 12 |
| PREAMBLE 810-2 | 7 | 7 | 7 | 7 | 7 | 7 | 7 | 7 | 7 | 7 |
| SFD 810-3 | 1 | 1 | 1 | 1 | 1 | 1 | 1 | 1 | 1 | 1 |
| DEST. ADDR. 810-4 | 6 | 6 | 6 | 6 | 6 | 6 | 6 | 6 | 6 | 6 |
| SRC. ADDR. 810-5 | 6 | 6 | 6 | 6 | 6 | 6 | 6 | 6 | 6 | 6 |
| 0X8100 810-6 | 2 | 2 | 2 | 2 | 2 | 2 | 2 | 2 | 2 | 2 |
| VLAN TAG 810-7 | 2 | 2 | 2 | 2 | 2 | 2 | 2 | 2 | 2 | 2 |
| TYPE LENGTH 810-8 | 2 | 2 | 2 | 2 | 2 | 2 | 2 | 2 | 2 | 2 |
| DATA 810-9 | 0 | 46 | 64 | 96 | 128 | 256 | 384 | 512 | 768 | 1024 |
| PADDING 810-10 | 46 | 0 | 0 | 0 | 0 | 0 | 0 | 0 | 0 | 0 |
| FCS 810-11 | 4 | 4 | 4 | 4 | 4 | 4 | 4 | 4 | 4 | 4 |
| MAC TOTAL 810-12 | 68 | 68 | 86 | 118 | 150 | 278 | 406 | 534 | 790 | 1046 |
| EFFECTIVE TOTAL 810-13 | 88 | 88 | 106 | 138 | 170 | 298 | 426 | 554 | 810 | 1066 |
| OVERHEAD TOTAL 810-14 | 88 | 42 | 42 | 42 | 42 | 42 | 42 | 42 | 42 | 42 |
| FPS MAX. 810-15 | 142K | 142K | 117K | 90.6K | 73.5K | 41.9K | 29.3K | 22.6K | 15.4K | 11.7K |
| DATA MAX. 810-16 | 0 | 52.3 | 60.4 | 69.6 | 75.3 | 85.9 | 90.1 | 92.4 | 94.8 | 96.1 |
| MAC MAX. 810-17 | 77.3 | 77.3 | 81.1 | 85.5 | 88.2 | 93.3 | 95.3 | 96.4 | 97.5 | 98.1 |
| FRAMES DETECTED 810-18 | 0 | 2 | 4 | 3 | 146 | 2096 | 1091 | 4099 | 3010 | 5087 |
| NUMBER OF BYTES 810-19 | 0 | 176 | 424 | 414 | 24.8K | 626K | 465K | 2.27M | 2.44M | 5.42M |

FIG. 9     900

| TIME/DURATION 902 | 904-1 | 904-2 | 904-3 | 904-4 | 904-5 | 904-6 | 904-7 | 904-8 | 904-9 | 904-10 |
|---|---|---|---|---|---|---|---|---|---|---|
| MINIMUM INTERFRAME GAP 910-1 | 12 | 12 | 12 | 12 | 12 | 12 | 12 | 12 | 12 | 12 |

| | | | | | | | | | | |
|---|---|---|---|---|---|---|---|---|---|---|
| PREAMBLE 910-2 | 7 | 7 | 7 | 7 | 7 | 7 | 7 | 7 | 7 | 7 |
| SFD 910-3 | 1 | 1 | 1 | 1 | 1 | 1 | 1 | 1 | 1 | 1 |
| DEST. ADDR. 910-4 | 6 | 6 | 6 | 6 | 6 | 6 | 6 | 6 | 6 | 6 |
| SRC. ADDR. 910-5 | 6 | 6 | 6 | 6 | 6 | 6 | 6 | 6 | 6 | 6 |
| 0X8100 910-6 | 0 | 0 | 0 | 0 | 0 | 0 | 0 | 0 | 0 | 0 |
| VLAN TAG 910-7 | 0 | 0 | 0 | 0 | 0 | 0 | 0 | 0 | 0 | 0 |
| TYPE LENGTH 910-8 | 2 | 2 | 2 | 2 | 2 | 2 | 2 | 2 | 2 | 2 |
| DATA 910-9 | 0 | 46 | 64 | 96 | 128 | 256 | 384 | 512 | 768 | 1024 |
| PADDING 910-10 | 46 | 0 | 0 | 0 | 0 | 0 | 0 | 0 | 0 | 0 |
| FCS 910-11 | 4 | 4 | 4 | 4 | 4 | 4 | 4 | 4 | 4 | 4 |

| | | | | | | | | | | |
|---|---|---|---|---|---|---|---|---|---|---|
| MAC TOTAL 910-12 | 64 | 64 | 82 | 114 | 146 | 274 | 402 | 530 | 786 | 1042 |
| EFFECTIVE TOTAL 910-13 | 84 | 84 | 102 | 134 | 166 | 294 | 422 | 550 | 806 | 1062 |
| OVERHEAD TOTAL 910-14 | 84 | 38 | 38 | 38 | 38 | 38 | 38 | 38 | 38 | 38 |

| | | | | | | | | | | |
|---|---|---|---|---|---|---|---|---|---|---|
| FPS MAX. 910-15 | 149K | 149K | 123K | 93.3K | 76.3K | 42.5K | 29.6K | 22.7K | 15.5K | 11.8K |
| DATA MAX. 910-16 | 0 | 54.8 | 62.7 | 71.6 | 77.1 | 87.1 | 91 | 93.1 | 95.3 | 96.4 |
| MAC MAX. 910-17 | 76.2 | 76.2 | 80.4 | 85.1 | 88 | 93.2 | 95.3 | 96.4 | 97.5 | 98.1 |

| | | | | | | | | | | |
|---|---|---|---|---|---|---|---|---|---|---|
| FRAMES DETECTED 910-18 | 0 | 0 | 1 | 8 | 201 | 2192 | 1238 | 5100 | 2100 | 6809 |
| NUMBER OF BYTES 910-19 | 0 | 0 | 102 | 1072 | 34.2k | 644K | 522K | 2.8M | 1.7M | 7.2M |

FIG. 10

| TOTAL BYTES 1002 | 11.2M |
|---|---|
| TOTAL FRAMES 1004 | 15.5K |

|  | 804-1 | 804-2 | 804-3 | 804-4 | 804-5 | 804-6 | 804-7 | 804-8 | 804-9 | 804-10 |
|---|---|---|---|---|---|---|---|---|---|---|
| % OF BYTES 1006 | 0 | 0 | 0 | 0 | 0.2 | 5.5 | 4.1 | 20.2 | 21.7 | 48.3 |
| % OF FRAMES 1008 | 0 | 0 | 0 | 0 | 0.9 | 13.5 | 7 | 26.4 | 19.4 | 32.8 |

| MAC TOTAL 1010 | 10.9M |
|---|---|
| OVERHEAD TOTAL 1012 | 653K |

| AV. FPS MAX 1014 | 17.3K |
|---|---|
| AV. DATA MAX. 1016 | 94.2Mbps |
| AV. MAC MAX. 1018 | 97.2Mbps |

| TOTAL BYTES 1102 | 12.9M |
|---|---|
| TOTAL FRAMES 1104 | 17.6K |

| | 904-1 | 904-2 | 904-3 | 904-4 | 904-5 | 904-6 | 904-7 | 904-8 | 904-9 | 904-10 |
|---|---|---|---|---|---|---|---|---|---|---|
| % OF BYTES 1106 | 0 | 2 | 2 | 4 | 5 | 6 | 7 | 8 | 9 | 10 |
| % OF FRAMES 1108 | 1 | 2 | 2 | 4 | 5 | 6 | 7 | 8 | 9 | 10 |

| MAC TOTAL 1110 | 12.6M |
|---|---|
| OVERHEAD TOTAL 1112 | 671K |

| AV. FPS MAX. 1114 | 17.1K |
|---|---|
| AV. DATA MAX 1116 | 94.8Mbps |
| AV. MAC MAX. 1118 | 97.3Mbps |

FIG. 12

DATA AND MEDIA ACCESS CONTROLLER (MAC) THROUGHPUTS

BACKGROUND INFORMATION

In recent years, carrier-class Ethernet has emerged as a significant technology with respect to traffic over Metropolitan Area Networks (MANs). Ethernet MANs offer cost-effective ways for interconnecting business offices, as well as ways for reaching and interfacing with customer Ethernets.

DETAILED DESCRIPTION OF PREFERRED EMBODIMENTS

The following detailed description refers to the accompanying drawings. The same reference numbers in different drawings may identify the same or similar elements.

As described below, a system may provide throughput information about Ethernet frames. The throughput information may be determined based on theoretical values and/or observed values of various field sizes within the Ethernet frames. The throughput information may be used, for example, in comparing potential performance of different Ethernet networks and/or evaluating different configurations of a given Ethernet network.

Figure 1:
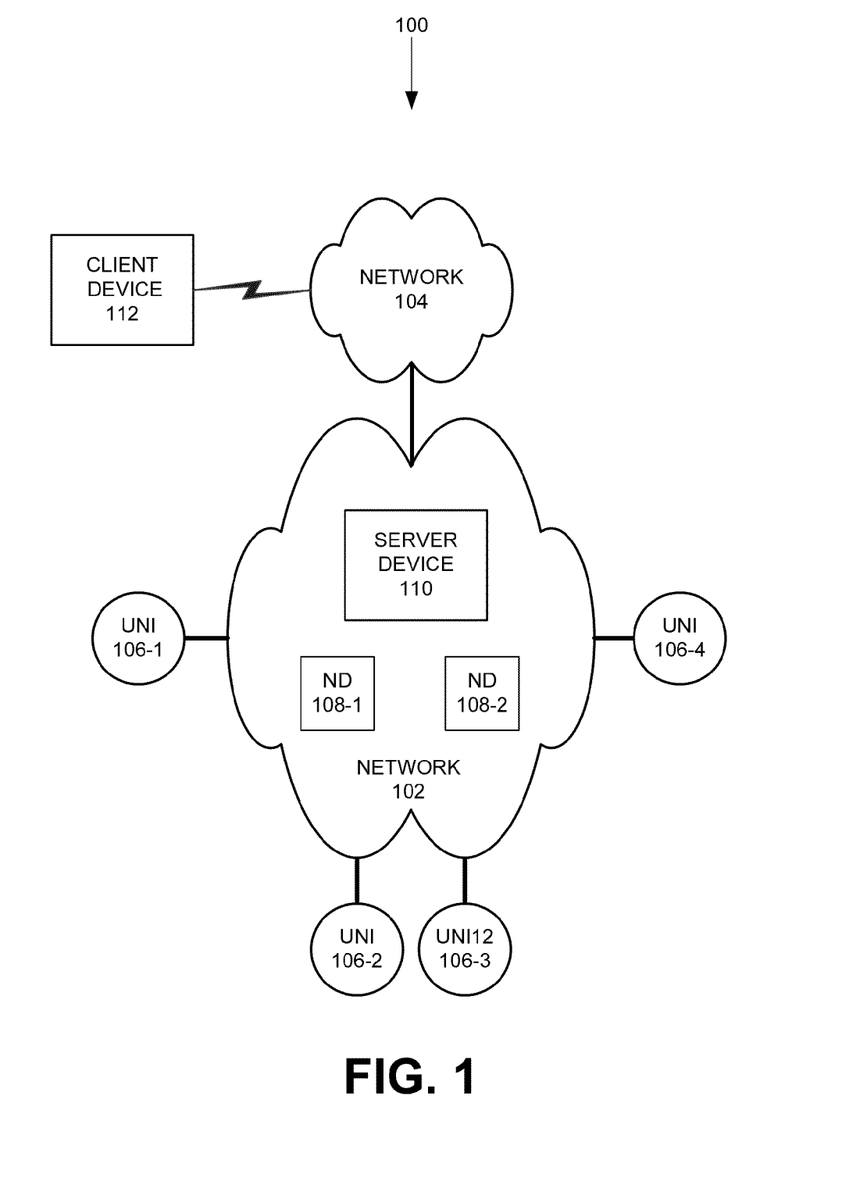
FIG. 1 illustrates an exemplary network in which concepts described herein may be implemented.

FIG. 1 shows an exemplary network 100 in which concepts described herein may be implemented. As shown, network 100 may include a service provider network 102, network 104, user to network interfaces (UNIs) 106-1 through 106-4 (collectively referred to as "UNIs 106" and individually as "UNI 106"), network devices (ND) 108-1 and 108-2 (collectively referred to as "network devices 108" and individually as "network device 108"), server device 110, and client device 112. Depending on the implementation, network 100 may include additional, fewer, or different networks and/or network elements/devices than those illustrated in FIG. 1. For example, in one implementation, network 100 may include one or more metro Ethernet networks (MENs), network-to-network interfaces (NNIs) between the MENs, Synchronous Optical Network (SONET) rings that are interconnected by long-haul optical lines, additional network elements (e.g., routers, switches, network devices, etc.), servers, client devices, wireless devices, etc.

Service provider network 102 may include optical fibers/non-optical lines and central office hubs that are interconnected by the fibers/lines. The optical fibers and the lines may form the backbone of service provider network 102. The central office hubs may provide telecommunication services to subscribers, such as telephone service, access to the Internet, cable television programs, etc., via line terminals. Each central office hub may house telecommunication equipment, including switches (e.g., Ethernet switches), optical line terminals, etc.

Network 104 may include a wired or wireless network via which devices communicate (e.g., a fiber-optic network, a local area network (LAN), a wide area network (WAN), a wireless LAN, a metropolitan area network (MAN), a cellular network, a public switched telephone network (PSTN), an intranet, the Internet, a satellite-based network, any other network, or a combination of networks).

UNI 106 may include a physical interface that is a demarcation point between a subscriber and a service provider. UNI 106 is typically provided by a service provider/carrier and may be capable of supporting one or more bandwidths, such as 10 Megabits per second (Mbps), 100 Mbps, 1 Gigabits per second (Gbps), 10 Gbps, etc. In some implementations, UNI 106 may provide information about traffic and/or throughput to another device, such as server device 110.

In FIG. 1, one UNI (e.g., UNI 106-1) may form an Ethernet virtual circuit (EVC) over network 102 with another UNI (e.g., UNI 106-2). The term Ethernet virtual circuit (EVC), as used herein, may not only refer to a logical network configuration, but also to a service provided by participating network elements (e.g., UNIs). Hence, a UNI that is part of an EVC may also participate in the EVC service.

Network device 108 may include switches (e.g., Ethernet switches), routers, and/or other network devices. Some of these devices may provide support for Ethernet services (e.g., Cisco 6509 Switch). In one implementation, network device 108 may also collect data about network traffic and/or statistics.

Figure 2A:
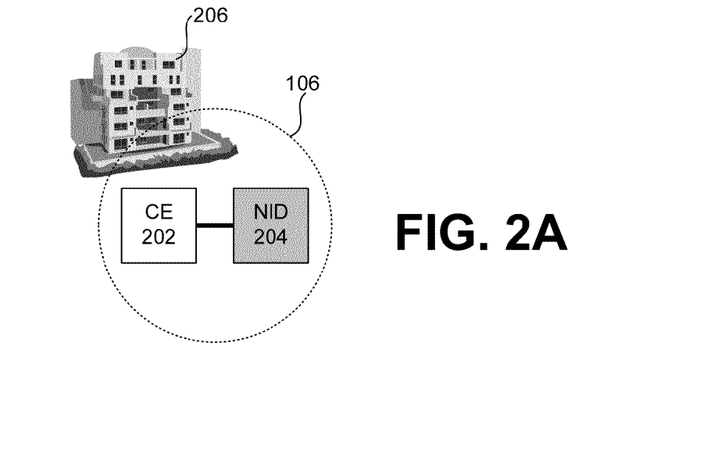
FIG. 2A is a diagram of exemplary components of a user-to-network interface (UNI) of FIG. 1.

FIG. 2A is a diagram of exemplary components of UNI 106. As shown, UNI 106 may include a customer edge (CE) device 202 and a network interface device (NID) 204. Depending on the implementation, UNI 106 may include fewer, additional, or different devices than those illustrated in FIG. 2A. For example, in one implementation, UNI 106 may include only NID 204. In another implementation, UNI 106 may include CE device 202, NID 204, and an Ethernet switch.

CE device 202 may provide an entry/exit to/from customer network, and may be located in customer premises 206 (e.g., office, apartment, house, etc.). Examples of CE device 202 include a router, modem, firewall, etc. In FIG. 2A, CE device 202 may provide the customer-side functions of UNI (UNI-C). Depending on the implementation, CE device 202 may provide throughput information for one or more communication paths to another network device (e.g., server device 110).

NID 204 may include a device that provides a service provider/carrier's functions of a UNI (UNI-N). In a different implementation, NID 204 may provide for other functions that are not necessarily associated with a UNI (e.g., signal processing). Examples of NID 204 include a telephone network interface (TNI), an optical network terminal (ONT), wiring terminals, etc.

Figure 2B:
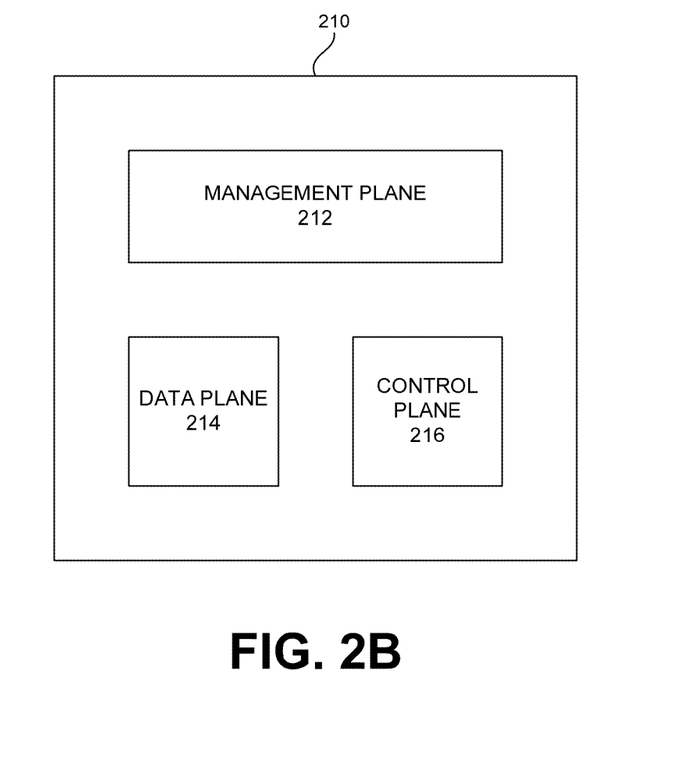
FIG. 2B is a block diagram of exemplary functional components of a network element or a network device of FIG. 1.

FIG. 2B is a block diagram of exemplary functional components of a network element of FIG. 1. Network element 210 may represent UNI 106, network device 108, a device in network 102 or 104, a device or component in UNI 106 or in network device 108. As shown in FIG. 2B, network element 210 may include a management plane component 212, data plane component 214, and control plane component 216. Depending on the implementation, network element 210 may include additional, fewer, or different components than those illustrated in FIG. 2B. For example, in some implementations, network element 210 may not include management plane component 212 or control plane component 216.

Management plane component 212 may include hardware and/or software components for supporting operation, administration, and management functions. For example, management plane component 212 may support discovery, remote failure detection/indication, remote loopback testing, alarm generation or processing, link performance monitoring, management information base (MIB) data retrieval, etc.

Data plane component 214 may include hardware/software components for processing data. In some implementations, such as routers or switches, data plane component 214 may forward data to their destinations in network 100. Examples of data plane component 214 may include an Ethernet card, line card of a router, packet processing engine on the line card, forwarding information base (FIB), switching table (e.g., Media Access Control (MAC) address table), etc.

Control plane component 216 may include hardware/software components for exchanging signaling information between a network device/element 210 and another network element. The information may include, for example, routing information in accordance with a specific protocol, traffic engineering information, etc.

Figure 3:
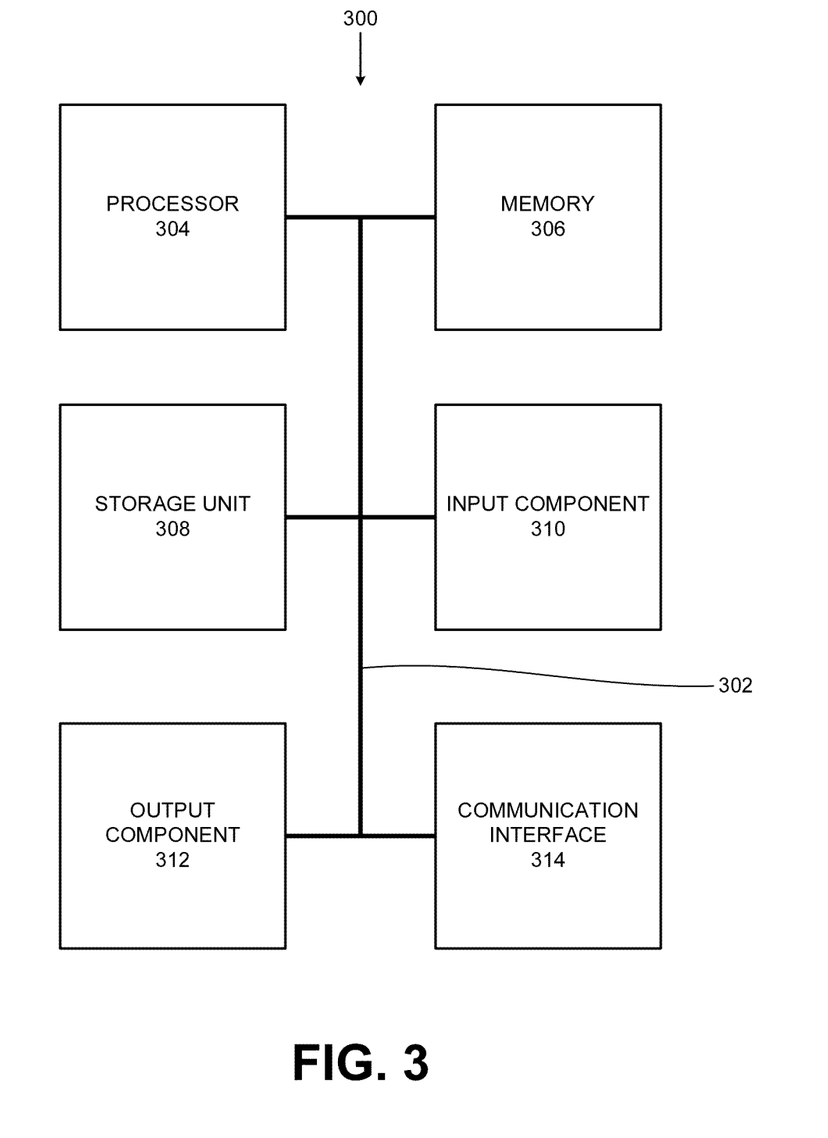
FIG. 3 is a block diagram of exemplary components of a network device/element of FIG. 2B.

FIG. 3 is a block diagram of an exemplary network device 300. Network device 300 may correspond to one or more of devices on which network elements in FIG. 1 may be implemented (e.g., customer edge device 202, network interface device 204, etc.) or devices in network 100 (e.g., network device 108). Referring to FIG. 3, network device 300 may include bus 302, processor 304, memory 306, storage unit 308, input component 310, output component 312, and communication interface 314. Bus 302 may include a path that permits communication among the elements of network device 300.

Processor 304 may include a processor, a microprocessor, an Application Specific Integrated Circuit (ASIC), a Field Programmable Gate Array (FPGA), and/or other processing logic (e.g., embedded devices) capable of controlling network device 300, processing data (e.g., incoming frames, etc.). Memory 306 may include static memory, such as read only memory (ROM), and/or dynamic memory, such as random access memory (RAM) and content addressable memory (CAM), or onboard cache, for storing data and machine-readable instructions (e.g., programs, scripts, etc.).

Storage unit 308 may include a floppy disk, CD ROM, CD read/write (R/W) disc, and/or flash memory, as well as other types of storage devices (e.g., hard disk drive) for storing data and/or machine-readable instructions (e.g., a program, script, etc.). Depending on the context, the term "memory," "storage," "storage device," and/or "storage unit" may be used interchangeably. For example, a "computer-readable storage device" or "computer readable medium" may refer to a memory and/or storage device.

Input component 310 may permit a user to input information to network device 300. Input component 310 may include, for example, a keyboard, a keypad, a mouse, a pen, a microphone, a touch screen, voice recognition and/or biometric mechanisms, etc. Output component 312 may include a mechanism that outputs information to the user. Output component 312 may include, for example, a display, a printer, a speaker, etc. In some implementations, because network device 300 may operate as a server device, network device 300 may include a minimal number of input components 310 and output components 312 (e.g., a keyboard and/or a console), to minimize cost and to increase robustness.

Communication interface 314 may include a transceiver (e.g., a transmitter or receiver) for network device 300 to communicate with other devices and/or systems. For example, via communication interface 314, network device 300 may communicate over a network, such as the Internet, an intranet, a terrestrial wireless network (e.g., a WLAN, WiFi, WiMax, etc.), a satellite-based network, optical network, etc. Communication interface 314 may also include a modem, an Ethernet interface to a LAN, and/or another interface.

Network device 300 may perform the operations described herein in response to processor 304 executing software instructions stored in a non-transient computer-readable medium, such as memory 306. A computer-readable medium may include a physical or logical memory device. The software instructions may be read into memory 306 from another computer-readable medium or from another device via communication interface 314. The software instructions stored in memory 306 may cause processor 304 to perform processes that are described herein.

Figure 4:
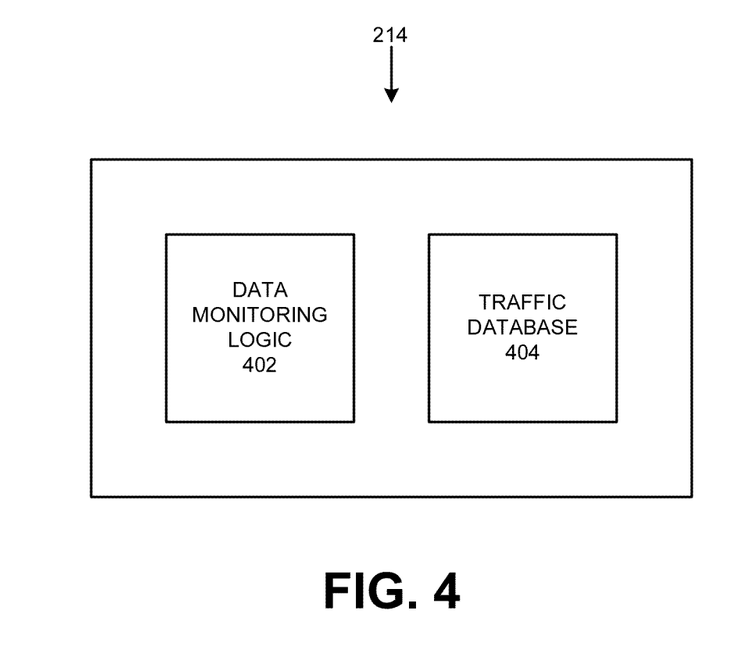
FIG. 4 is a block diagram of exemplary functional components of the data plane of a network element of FIG. 1.

FIG. 4 is a block diagram of exemplary functional components of data plane 214 of a network element of FIG. 1. (e.g., one of elements 106, 108, 110, and 112). As shown, data plane 214 may include traffic data monitoring logic 402 and traffic database 404. Depending on the implementation, data plane component 214 may include additional, fewer, different, or a different arrangement of logic/components than those illustrated in FIG. 4. For example, data plane component 214 may include software and/or hardware for looking up access control list (ACL). Furthermore, although data plane component 214 may include additional components, they are not shown in FIG. 4 for simplicity.

Data monitoring logic 402 may examine layer 2 traffic and collect statistics for the traffic. For example, in one implementation, data monitoring logic 402 may examine received Ethernet frames. For each Ethernet frame, data monitoring logic 402 may determine whether a virtual local area network (VLAN) tag is filled, determine source and destination Media Access Controller (MAC) addresses, etc., and store the data in traffic database 404. In collecting data, data monitoring logic 402 may be capable of examining Ethernet frames over a particular time period(s), selecting frames with particular field values (e.g., frames with the same source address, the same VLAN tag value, the same data size, etc.), etc.

In some implementations, data monitoring logic 402 may receive specific conditions (e.g., time, duration, number of frames to observe, etc.) under which data monitoring logic 402 is to observe incoming Ethernet frames, from server device 110. For example, server device 110 may send a message indicating that data monitoring logic 402 is to collect information on Aug. 20, 2012 between 7:30 and 7:35 for specific MAC addresses and for a specific VLAN. Upon receipt of the message, data monitoring logic 402 may schedule a monitoring session, to collect Ethernet frame statistics.

Traffic database 404 may include traffic information collected by data monitoring logic 402, as well as information derived/calculated from the collected data. In some implementations, traffic database 404 may be periodically flushed, overwritten, and/or copied to another storage component.

Figure 5:
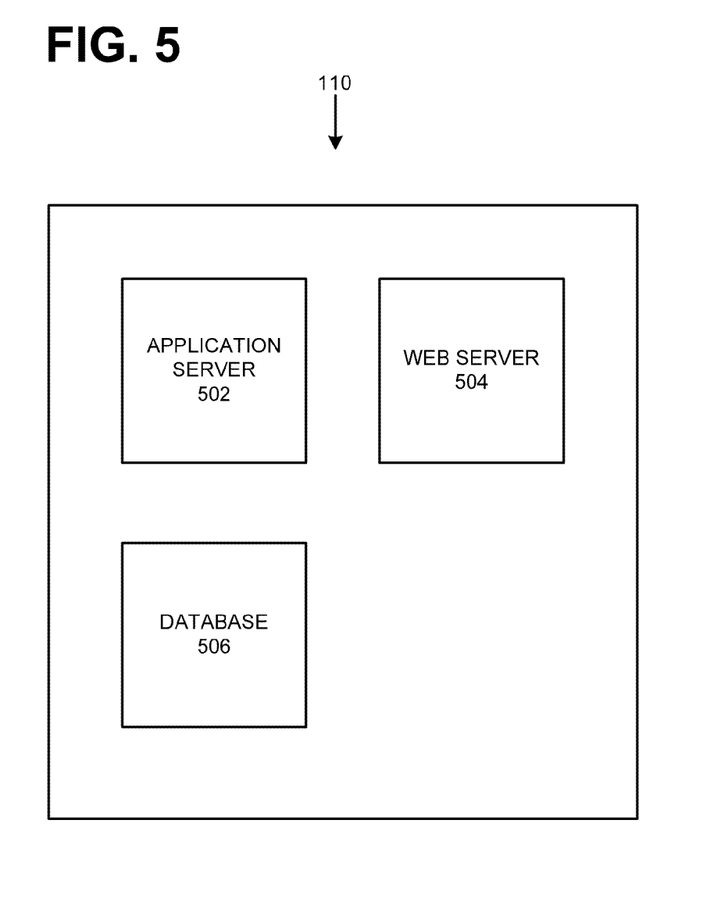
FIG. 5 is a block diagram of exemplary functional components of the server device of FIG. 1.

FIG. 5 is a block diagram of exemplary functional components of server device 110. As shown, server device 110 may include an application server 502, a web server 504, and a database 506. Depending on the implementation, server device 110 may include additional, fewer, different or a different arrangement of components than those illustrated in FIG. 5. Furthermore, although not illustrated, server device 110 may include additional components, such as device drivers, communication software, operating system, etc.

Application server 502 may receive traffic data from traffic database 404 in network element 210, obtain/derive statistics based on the traffic data, store the traffic data and the statistics in database 506, provide the traffic data and/or statistics data to a client (e.g., via web server 504), and/or remove/delete the traffic data/statistics.

In some implementations, application server 502 may receive, from client device 112, descriptions of specific conditions under which information about Ethernet frames are to be collected. Upon receipt of the specification from client device 112, server device 110 may forward the specification to specific network element(s) 210. Network element 210, in turn, may either schedule a session for monitoring Ethernet frames or begin to immediately monitor Ethernet frames at specified ports (e.g., the specification may include port numbers that identify the ports).

Web server 504 may receive client/browser messages from client device 112, and relay the messages to application server 502. Application server 502 may provide a response to the messages, which web server 504 may relay to client device 112 via web server 504.

Database 506 may store traffic data and/or traffic statistics from application server 502. Application server 502 may provide the traffic data/statistics to other devices, such as client device 112.

Figure 6:
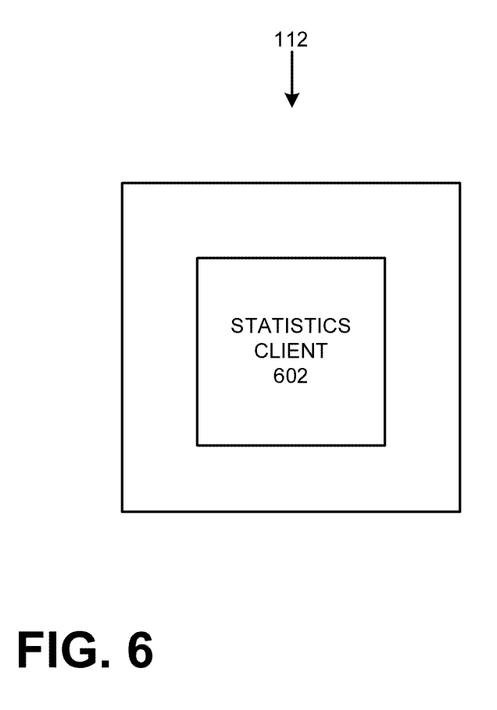
FIG. 6 is a block diagram of an exemplary functional component of the client device of FIG. 1.

FIG. 6 is a block diagram of an exemplary functional component of client device 112. As shown, client device 112 may include a statistics client 602. Depending on the implementation, client device 112 may include additional or different components. Although client device 112 may also include additional components, for simplicity, they are not illustrated in FIG. 6. (e.g., an operating system, communication software, email client, etc.).

Statistics client 602 may include an application for receiving user input requesting traffic data/statistics, for sending a message to server device 110 for the traffic data/statistics, for receiving a response from server device 110, and for providing the response to the user. Depending on the implementation, statistics client 602 may include a browser, a plug-in, and/or web pages. In other implementations, statistics client 602 may include a stand-alone client application.

In some implementations, statistics client 602 may receive user input that specifies conditions for collecting data on Ethernet frames. For example, via statistics client 602, a user may specify specific network element 210/ports at which Ethernet frames are to be monitored, the times/duration for which Ethernet frames are to be monitored, the total number of frames that are to be monitored, source/destination MAC addresses, the sizes of payloads for which Ethernet frames are to be monitored, etc. Statistics client 602 may send the specification to server device 110, which may then relay the specification to network element 210.

A user may obtain Ethernet frame statistics via statistics client 602 on client device 112 for a number of reasons. For example, the user may need such information to estimate the number of network devices/switches to purchase, or to determine its network capacity for handling traffic to/from the Internet, to determine optimal network configurations, etc.

Figure 7A:
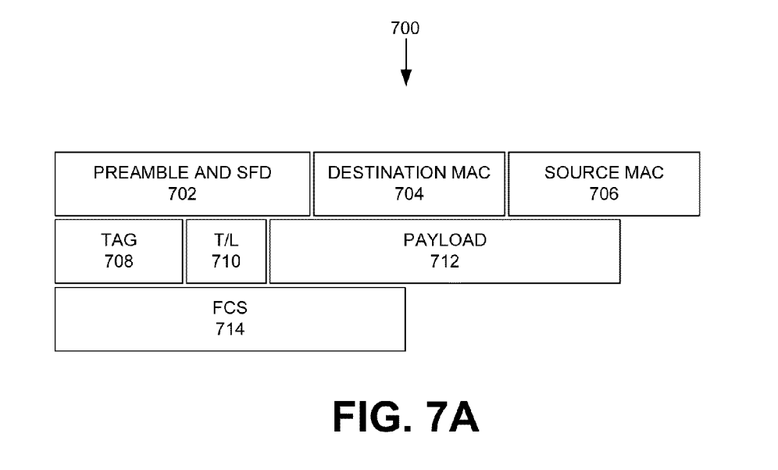
FIG. 7A is a block diagram of an exemplary tagged Ethernet frame.

FIG. 7A is a block diagram of an exemplary Ethernet frame 700. As discussed above, network 104 may include Ethernet and accordingly, convey network traffic in the form of Ethernet frames. As shown in FIG. 7A, Ethernet frame 700 may include a preamble and a start frame delimiter field (SFD) 702, destination MAC address field 704, source MAC address field 706, tag field 708, Type/Length (T/L) field 710, payload field 712, and Frame Check Sequence (FCS) field 714.

Depending on the implementation, Ethernet frame 700 may support a particular format (e.g., Institute of Electrical and Electronic Engineers (IEEE) 802.3-2005, IEEE 802-2006, Ethernet Version 2, IEEE 802.2, etc.), and thus, may include additional, fewer, or different fields than those illustrated in FIG. 7A. For example, an Ethernet 802.2 Logical Link Control (LLC) frame type may include a length field, destination service access point (DSAP) field, source service access point (SSAP) field, etc. In another example, when Ethernet frame 700 does not provide for a virtual LAN (VLAN) service, Ethernet frame 700 may not include tag field 708. In yet another example, Ethernet frame 700 may include additional VLAN tags.

Preamble and SFD field 702 may include a synchronization bit pattern and a start frame delimiter (SFD). Destination MAC address field 704 may include the identifier for a destination network interface, in a network, to which Ethernet frame 700 is sent. The destination address may be a broadcast, unicast, or multicast address.

Source MAC address field 706 may include an identifier of the source network interface, in a network, from which the Ethernet frame has been transmitted. The source address may be a unicast address.

Tag field 708 may include an IEEE 802.1Q tag, also called a VLAN tag. A VLAN tag describes the VLAN to which Ethernet frame 700 belongs. The VLAN tag is described below with reference to FIG. 7B.

T/L field 710 may include an Ethernet type field or length field. In some implementations, T/L field 710 may identify the specific communication protocol using frame 700. Payload field 712 may include data. If there is less than 46 bytes of data in payload field 712, payload field 712 may include a padding to render payload field 712 at least 46 bytes. FCS field 714 may include frame check sequence (FCS), such as cyclic redundancy check (CRC) bits.

Figure 7B:
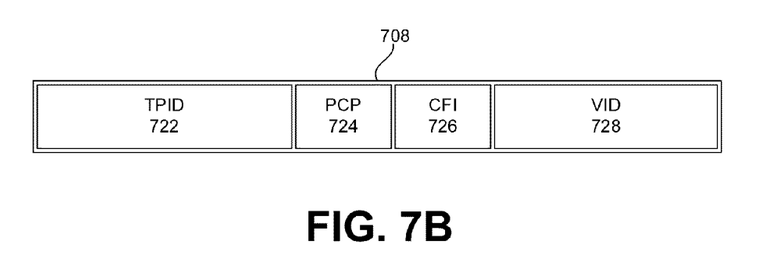
FIG. 7B is a block diagram of an exemplary virtual Local Area Network (VLAN) tag.

FIG. 7B is a block diagram of an exemplary VLAN tag 708. As shown, VLAN tag 708 may include a Tag Protocol Identifier (TPID) field 722, priority code point (PCP) field 724, canonical format indicator (CFI) field 726, and VLAN identifier field 728. TPID field 722 may include a particular sequence of bits to indicate that frame 700 includes a VLAN tag 708.

PCP field 724 may indicate a priority level of frame 700 that includes VLAN tag 708. Values in PCP field 724 may indicate different Class of Service (CoS). CFI field 726 may indicate whether MAC addresses in the Ethernet frame are in a canonical format. CFI field 726 may be used for compatibility between Ethernet and Token Ring networks. VLAN identifier field 728 may specify the VLAN to which Ethernet frame 700 belongs.

Figure 8:
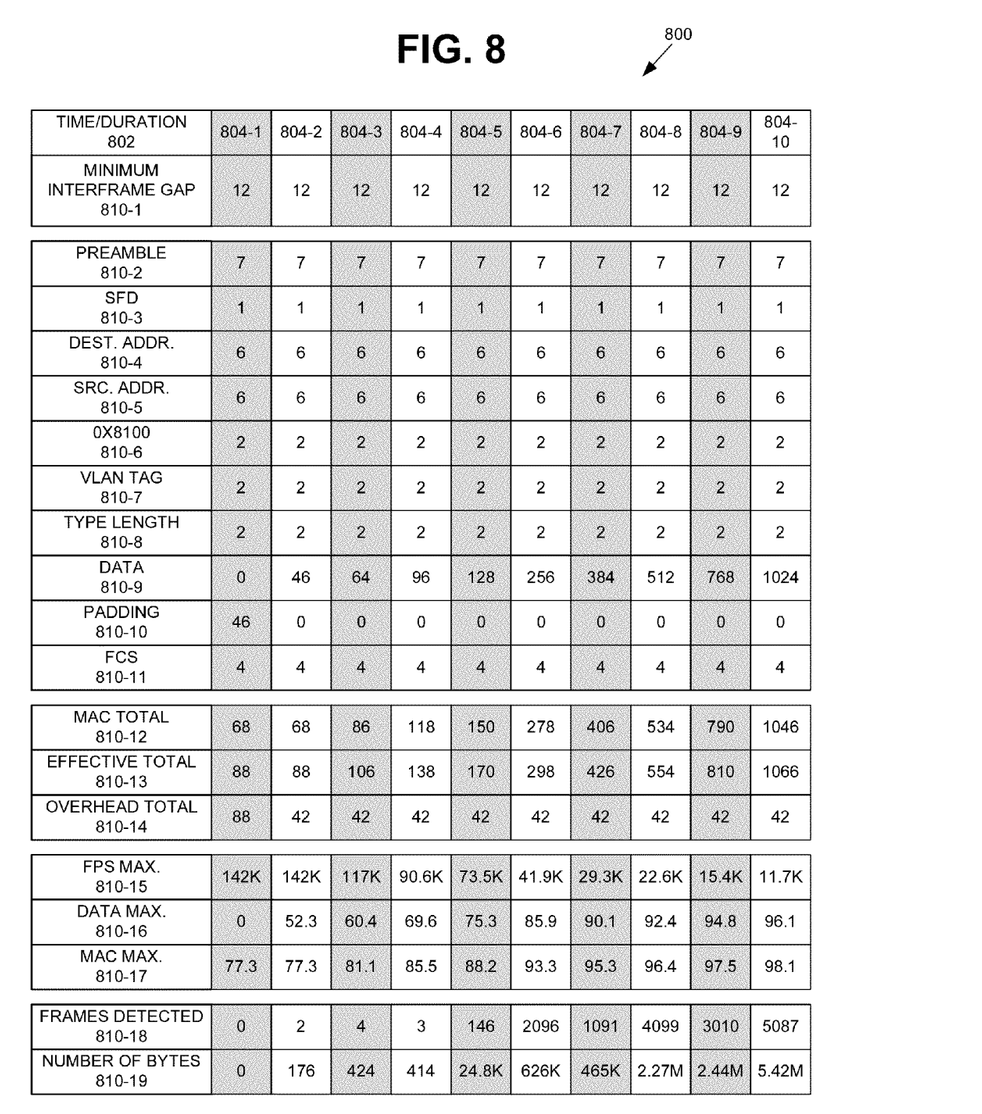
FIG. 8 is an exemplary table illustrating exemplary sizes of a minimum inter-frame gap and the Ethernet frame fields illustrated in FIGS. 7A and 7B.

FIG. 8 illustrates an exemplary table 800 in traffic database 404 and/or database 506 of server device 110. In some implementations, server device 110 may create and store table 800 in database 506 based on information/table provided by network element 210. As shown, table 800 includes sizes of fields in various Ethernet frames monitored by network element 210. Some of the fields include theoretical values, and other fields include observed values.

As shown, table 800 may include, a time/duration field 802, and columns 804-1 through 804-10 (collectively referred to as "columns 804" and individually as "column 804"). Each column 804-1 may include a minimum inter-frame gap size field 810-1, preamble size field 810-2, SFD size field 810-3, destination address size field 810-4, source address size field 810-5, 0x8100 size field 810-6, VLAN tag size field 810-7, T/L size field 810-8, data size field 810-9, pad size field 810-10, FCS size field 810-11, MAC total size field 810-12, effective total size field 810-13, overhead size field 810-14, frames per second (FPS) maximum rate field 810-15, data maximum rate field 810-16, MAC maximum rate field 810-17, number of frames detected field 810-18, and number of bytes field 810-19. Depending on the implementation, table 800 may include additional, fewer, different, or a different arrangement of fields than those illustrated in FIG. 8. For example, in one implementation, table 800 may not include number of frames detected field 810-18 or another field. In another implementation, table 800 may include fields that identify network element(s) at which the information in table 800 was collected.

Time/duration field 802 may specify/identify the time at which some of the information in table 800 was collected by network element 210 and the period of time over which the information was collected.

Minimum inter-frame gap size field 810-1 may indicate the minimum number of bytes (e.g., 12) between consecutively transmitted Ethernet frames in a given channel. Preamble size field 810-2, SFD size field 820-3, destination address size field 810-4, and source address size field 810-5 may include the sizes of the following fields in Ethernet frame 700: a preamble field (part of field 702) (7 bytes); a SFD field (part of field 702), (1 byte); destination MAC address field 704 (6 bytes); and source MAC address field 706 (6 bytes).

0x8100 size field 810-6 may include the size of TPID field 722 in tag 708, which indicates, e.g., to a device receiving Ethernet frame 700, that Ethernet frame 700 includes tag 708. 0x8100 size field 810-6 may include, for example, 2 bytes.

VLAN tag size field 810-7 may include the combined sizes of PCP field 724, CFI field 726, and VID field 728. VLAN tag size field 810-7, for example, may be 2 bytes. T/L size field 810-8 may include T/L field 710's size, which, for example, may be 2 bytes.

Data size field 810-9 may indicate the size of payload field 712 in Ethernet frame 700. For example, data size field 810-9 for column 804-2 includes the value of 46 bytes. Table 800 illustrates Ethernet frames of various data sizes. Each data size corresponds to a different column in table 800.

Padding size field 810-10 may indicate the size of bytes that are inserted into payload field 712, to pad Ethernet frame 700 when no data is present (i.e., data size field 810-9 includes zero). Padding size field 810-10 may include, for example, 46 bytes when data size field 810-9 is zero (e.g., column 804-1). FCS size field 810-11 includes the size of FCS field 714. FCS size field 810-11 may include, for example, 4 bytes.

MAC total size field 810-12 may include the sum of values in fields 810-4 through 810-11. Effective total size field 810-13 may include the sum of values in fields 810-1 through 810-11. Thus, effective total size field 810-13 may include a minimum inter-frame gap size field 810-1 value, preamble size field 810-2 value, and SFD size field 810-3 value, in contrast to MAC total size field 810-12.

Overhead total size field 810-14 may indicate the difference between effective total size field 810-13 value and data size field 810-9 value. For example, at column 804-3, effective total size field 810-13 value and data size field 810-9 value are shown as 106 and 64, respectively. Accordingly, overhead total size field 810-14 value is 106−64=42.

Frames per second (FPS) maximum rate field 810-15 may indicate the maximum rate at which Ethernet frames of a particular payload size may be transmitted in over a communication channel of a given bandwidth. For example, in column 804-1, effective total size field 810-13 has the value 88 bytes/frame=704 bits/frame. Thus, given a channel having a bandwidth (BW) of 100 Mbps, the FPS max. rate field 810-15 value is given by: BW/704 frame=100 M/704 frames=142K frames/second.

Data maximum rate field 810-16 is the maximum percentage, of a given bandwidth, that can be allocated to conveying data for Ethernet frames with a given payload size. Data maximum rate field 810-16 value is given by: (data size field 810-9 value/effective total size field 810-13 value)×100%. For example, at column 804-2, data size field 810-9 value and effective total size field 810-13 value are 46 and 88, respectively. Accordingly, data maximum rate field 810-16 value is given by: (46/88)×100%=52.2%.

MAC maximum rate field 810-17 may indicate the percentage, of a given bandwidth, that is allocated for the number of bytes indicated by MAC total size field 810-12, given Ethernet frames of a particular payload size. MAC maximum rate field 810-17 is determined by: (MAC total size field 810-12 value/effective total size field 810-13 value)×100%. For example, at column 804-8, MAC total size field 810-12 value and effective total size field 810-13 are 534 and 554. Accordingly, MAC total size field 810-12 value is given by: (534/554)×100%=96.4%.

Frames detected field 810-18 may indicate, for Ethernet frames of a given payload size corresponding to a column, the number of frames detected (e.g., over one or more time periods). For example, at column 804-7, the corresponding data size (e.g., value of data size field 810-9) is 384. The number of Ethernet frames that have the data size of 384 and are detected (e.g., by one or more network elements 210 over one or more time periods) is 1091 frames. Data for frames detected field 810-18 is collected by network element 210, whereas data in fields 810-1 through 810-17 is theoretical or expected based on the network configuration/setup.

Number of bytes field 810-19 may indicate the total number of bytes associated with the Ethernet frames detected by network elements 210. A value in number of bytes field 810-19 is given by: (a value in the number of frames detected field 810-18x effective total size field 810-13 value. For example, in column 804-2, the value of frames detected field 810-18 and the value of effective total size field 810-13 are 2 and 88, respectively. Accordingly, number of bytes field 810-19 value is given by: 88×2=176 bytes.

Figure 9:
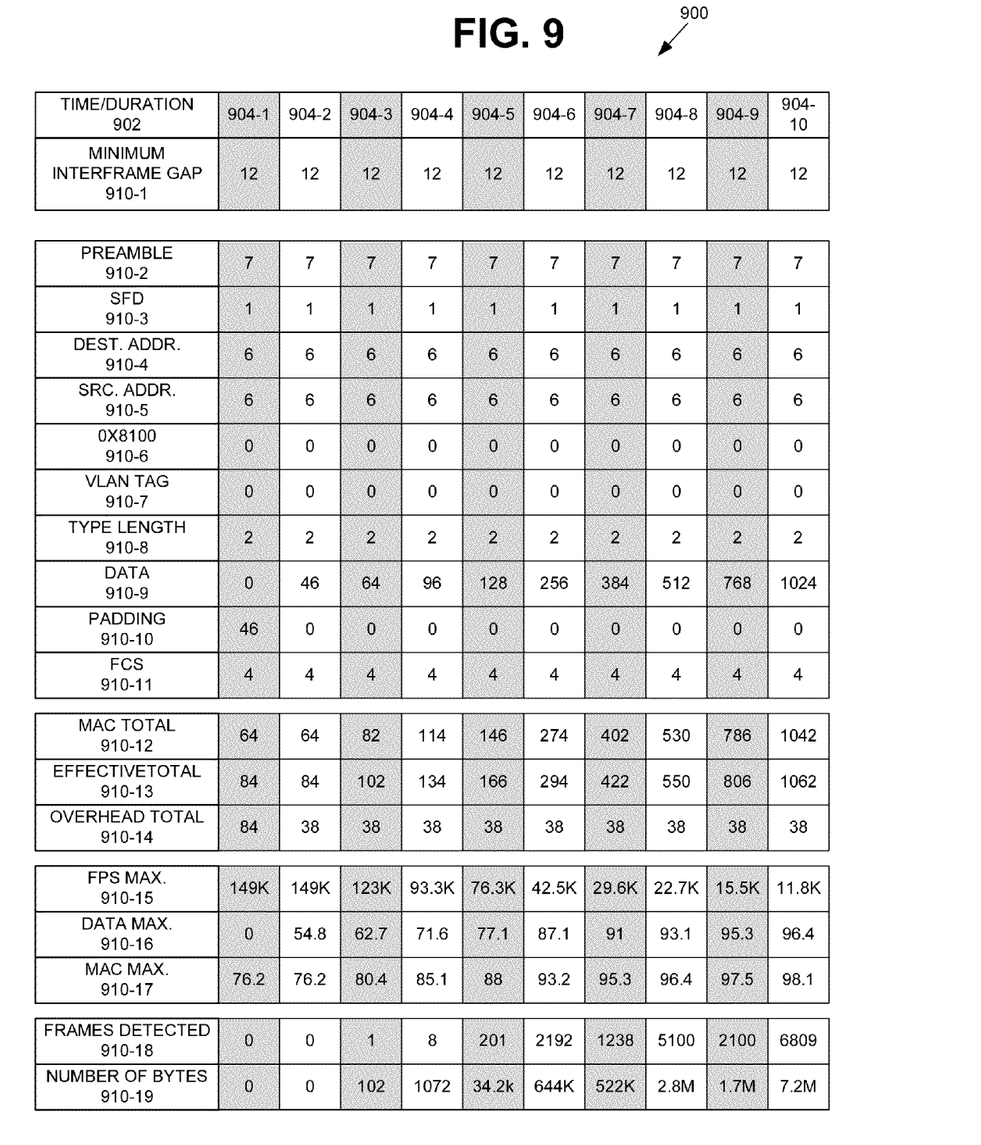
FIG. 9 is another exemplary table illustrating exemplary sizes of a minimum inter-frame gap and the Ethernet frame fields illustrated in FIGS. 7A and 7B.

FIG. 9 is another exemplary table 900 illustrating exemplary sizes of a minimum inter-frame gap and Ethernet frame fields illustrated in FIGS. 7A and 7B. 0x8100 size field 910-6 and VLAN tag size field 910-7 are set to zero for all columns, in contrast to the corresponding fields in table 800. In addition, the values in MAC total size field 910-12, effective total size field 910-13, FPS maximum rate field 910-15, data maximum rate field 910-16, and MAC maximum rate field 910-17 in table 900 are larger than the values in the corresponding fields in table 800. Overhead total field 910-14 values in table 900 are smaller than the corresponding values in table 800, because Ethernet frames of table 900 include fewer bytes than the Ethernet frames of table 800. Because data in table 900 represent a result of monitoring different Ethernet frames than those monitored for table 800, the field values in table 900 are different from the corresponding field values in table 800.

Number of bytes field 810-19 may indicate the total number of bytes associated with the Ethernet frames detected by network elements 210. A value in number of bytes field 810-19 is given by: (a value in the number of frames detected field 810-18)×effective total size field 810-13 value. For example, in column 804-2, the value of frames detected field 810-10 and the value of effective total size field 810-13 are 2 and 88, respectively. Accordingly, number of bytes field 810-19 value is given by: 88×2=176 bytes.

FIG. 9 is another exemplary table 900 illustrating exemplary sizes of a minimum inter-frame gap and Ethernet frame fields illustrated in FIGS. 7A and 7B. 0x8100 size field 910-6 and VLAN tag size field 910-7 are set to zero for all columns, in contrast to the corresponding fields in table 800. In addition, the values in MAC total size field 910-12, effective total size field 910-13, FPS maximum rate field 910-15, data maximum rate field 910-16, and MAC maximum rate field 910-17 in table 900 are larger than the values in the corresponding fields in table 800. Overhead total field 910-14 values in table 900 are smaller than the corresponding values in table 800, because Ethernet frames of table 900 include fewer bytes than the Ethernet frames of table 800. Because data in table 900 represent a result of monitoring different Ethernet frames than those monitored for table 800, the field values in table 900 are different from the corresponding field values in table 800.

Figure 10:
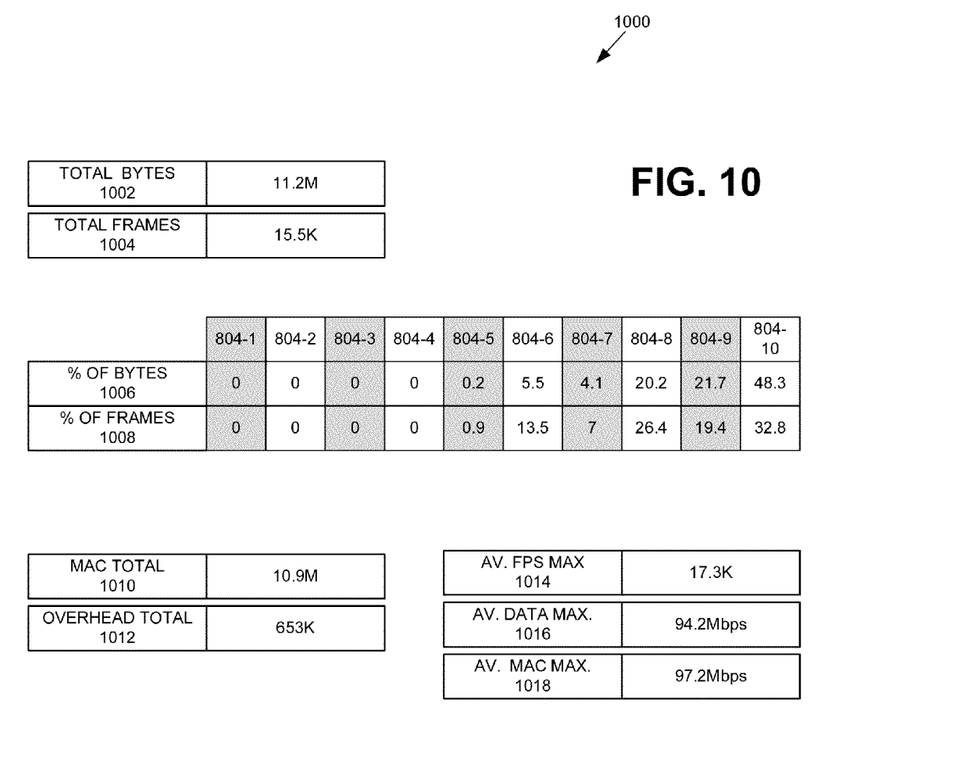
FIG. 10 illustrates a number of parameters derived from the table of FIG. 8.

FIG. 10 illustrates a number of parameters obtained/derived from table 800. The parameters may be included, for example, as a table 1000 in database 506 and provided to client device 112 via application server 502. As shown, the parameter table 1000 may include total bytes field 1002, total frames field 1004, percent (%) of bytes field 1006 for each column 804, percent (%) of frames field 1008 for each column 804, MAC total field 1010, overhead total field 1012, average FPS maximum field 1014, average data maximum field 1016, and average MAC maximum field 1018. Depending on the implementation, database 506 may include additional, fewer, and/or different sets of parameters than those illustrated in FIG. 10.

Total bytes field 1002 may include the sum of the values in number of bytes fields 810-19 of columns 804-1 through 804-10. Total frames field 1004 may include the sum of the values in frames detected fields 810-18 of columns 804-1 through 804-10.

Percent of bytes field 1006, for a given column, is the value of number of bytes field 810-19 divided by the value of total bytes field 1002. Percent of frames field 1008 for a given column, is the value of frames detected field 810-18 divided by the value of total frames field 1004.

MAC total field 1010 may indicate the sum of values in fields 810-12 in columns 804-1 through 804-10. Overhead total field 1012 may indicate the sum of values in fields 810-14 in columns 804-1 through 804-10.

Average FPS maximum field 1014 may indicate FPS maximum rate field 810-15 values averaged over all of frames detected for table 800. Expressed differently, $$\text{Average } FPS \text{ maximum field } 1014 \text{ value} = \sum_{columns} (\text{frames detected field } 810\text{-}18 \text{ value})/TT1. \quad (1)$$

In expression (1), TT1 is the total amount of time taken for the transmission or reception of the frames. For example, TT1 is given by the amount of time taken by the total number of bytes (i.e., the value of total bytes field 1002) to be transmitted/received. In this example, TT1=Total bytes field 1002×8/100,000,000.

Average data maximum field 1016 may indicate the data maximum rate field 810-16 values averaged over all of frames detected for table 800. Expressed differently, $$\text{Average data maximum field } 1016 \text{ value} = \sum_{columns} (\text{data size field } 810\text{-}16 \times \text{frames detected field } 810\text{-}18) \times C1. \quad (2)$$

In expression (2), C1=8×100/BW/TT1, where BW is the channel bandwidth. In table 800, BW is assumed to be 100 Mbps. In other implementations, BW may be 1 Mbps, 10 Mbps, 1 Gbps, 10 Gbps, 100 Gbps, etc. In some implementations, BW may be an observed value.

Average MAC maximum field 1018 may indicate the MAC maximum rate field 810-17 values averaged over all of frames detected for table 800. Expressed differently, $$\text{Average } MAC \text{ maximum field } 1018 \text{ value} = \sum_{columns} (MAC \text{ max. rate field } 810\text{-}17 \times \text{frames detected field } 810\text{-}18) \times C1. \quad (3)$$

Figure 11:
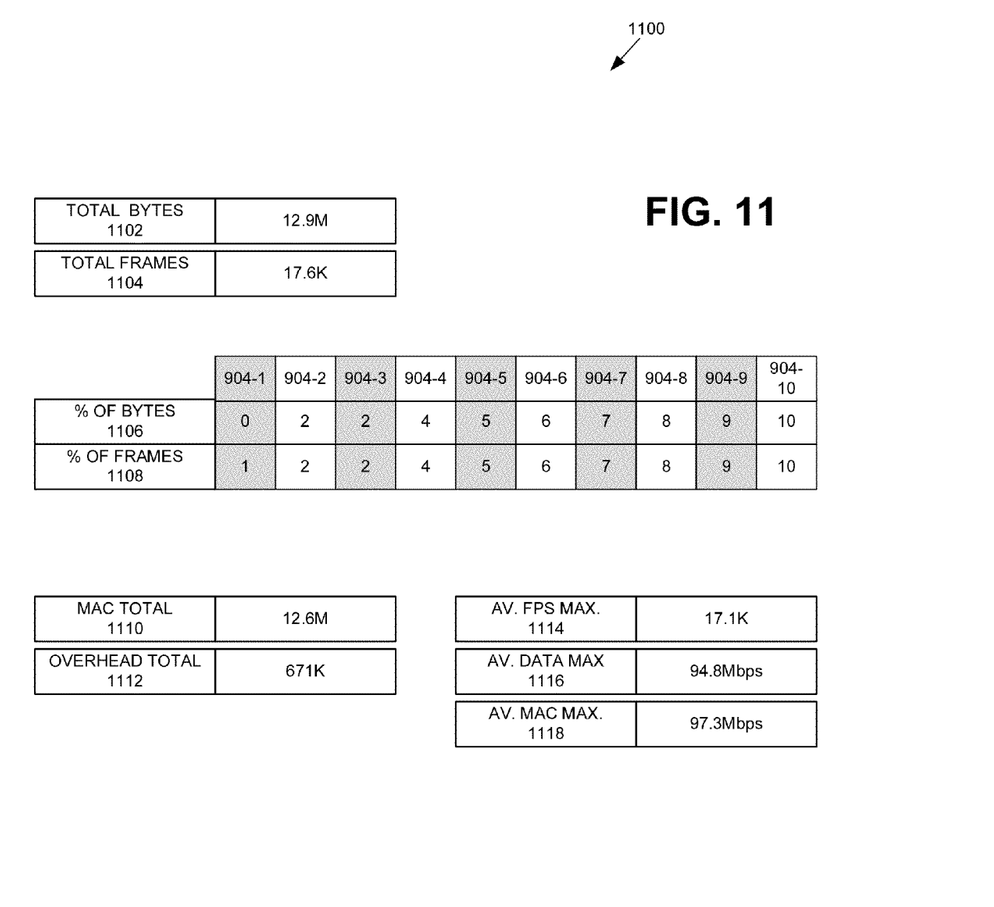
FIG. 11 illustrates a number of parameters derived from the table of FIG. 9.

FIG. 11 illustrates a number of parameters obtained/derived from table 900 and included in database 506. The parameters may be included, for example, as a table 1100 in database 506 and provided to client device 112 via application server 502. As shown, the parameter table 1100 may include total bytes field 1102, total frames field 1104, percent (%) of bytes field 1106 for each column 904, percent (%) of frames field 1108 for each column 904, MAC total field 1110, overhead total field 1112, average FPS maximum field 1114, average data maximum field 1116, and average MAC maximum field 1118. These parameters are similar to those listed in FIG. 10, and may be computed similarly as the corresponding parameters in FIG. 10 and described above, but based on information in table 900.

Figure 12:
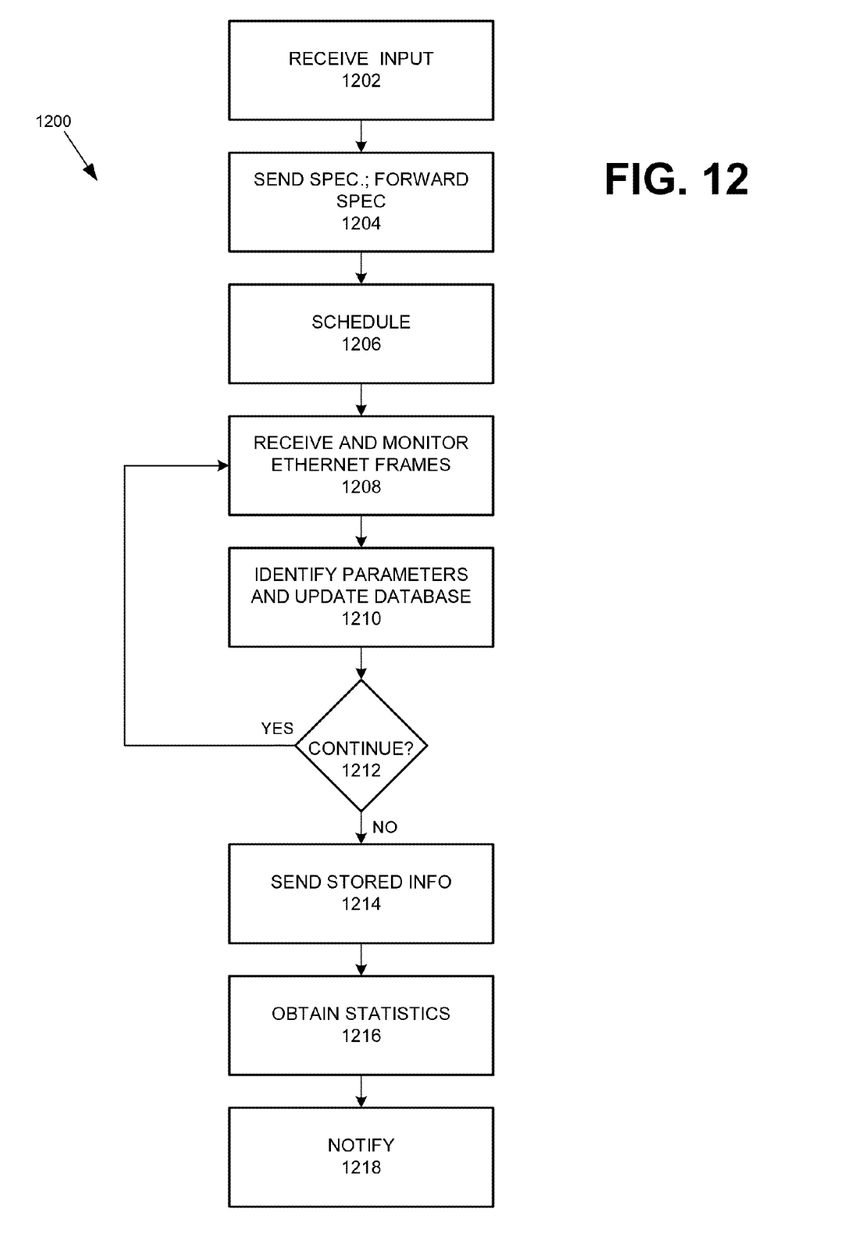
FIG. 12 is a flow diagram of an exemplary process that is associated with network elements and/or devices of FIG. 1.

FIG. 12 is an exemplary flow diagram of a process 1200 that is associated with network elements 210 and/or devices of FIG. 1. Process 1200 may be performed by one or more network elements/devices of FIG. 1. As shown, process 1200 may include client device 112 receiving user input (block 1202). The user input may include a specification of how and when data associated with Ethernet frames may be collected. For example, user input may specify end nodes exchanging traffic, VLAN number, destination MAC address, source MAC address, the time period for which the data maybe collected, etc.

Client device 112 may send the specification for collecting data to server device 110 (block 1204). In turn, server device 110 (e.g., via application server 502) may forward the specification (in the same or another format) to network element 210 (block 1204). In accordance with the specification, network element 210 may immediately begin to monitor incoming Ethernet frames at specific ports, or schedule a monitoring session (block 1206).

At the scheduled times, network element 210 may monitor Ethernet frames. For example, network element 210 may begin to monitor Ethernet frames by receiving frames at particular network ports (block 1208). For each Ethernet frame that network element 210 receives, network element 210 may identify parameters (e.g., determine the size of its payload, its source MAC address, destination MAC address, etc.), and update its traffic database 404 (e.g., a table similar to table 800 in database 404) (block 1210).

In a different implementation, traffic database 404 may include information for each of the Ethernet frames. In situations where network element 210 is under memory constraints, network element 210 may summarize the information about a group/set of Ethernet frames in a table, and flush the data for the individual Ethernet frames.

Network element 210 may determine whether to continue to monitor Ethernet frames (block 1212). For example, network element 210 may determine whether conditions for terminating the monitoring have been met (e.g., the scheduled monitoring times have elapsed, the prescribed number of frames have been detected, etc.). If network element 210 determines that the monitoring is to continue (block 1212: yes), process 1200 may return to block 1208. Otherwise (block 1212: no), process 1200 may proceed to block 1214.

Network element 210 may send stored information about the monitored Ethernet frames to server device 110 (block 1214). Network element 210 may send the information automatically after network element 210 finishes its monitoring or in response to a request for the information from server device 110.

Server device 110 may obtain statistics (e.g., information in table 800 and 900) for Ethernet frames monitored/observed at network element 210 (block 1216). In some implementations, server device 110 may calculate the statistics in response to a request from client device 112. In other implementations, server device 110 may compute the statistics in response to receipt of the information from network element 210.

Server device 110 may notify client device 112 that the Ethernet statistics are available (block 1218). Depending on the implementation, server device 110 may send an email message, text message, etc. In a different implementation, server device 110 may wait until client device 112 requests server device 110 to provide the statistics.

As described above, a system may provide throughput information about Ethernet frames. The throughput information may have been determined based on theoretical values and/or observed values of various field sizes within the Ethernet frames. In some implementations, the portion, of the throughput information (e.g., Ethernet frame information), determined based on the theoretical values may be predetermined or pre-computed. The throughput information may be used, for example, in comparing potential performance of different networks and/or evaluating different configurations of a given Ethernet.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, some numbers in tables 800 and 900 in FIG. 9 are tabulated under the assumption that the Ethernet channel bandwidth is 100 Mbps. In some implementations, values may be tabulated for 1 Mbps, 10 Mbps, 1 Gbps, 10 Gbps, 100 Gbps, etc. In other implementations, values may be tabulated for an observed channel bandwidth (e.g., bandwidth of a VLAN path). In another example, although network devices and elements have been described above with reference to Ethernet frames, in other embodiments, network devices and elements may collect and determine statistics for other types of frames, packets, data units for communication, etc.

In addition, while a series of blocks has been described with regard to the process illustrated in FIG. 12, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
  receiving a request, from a client, to obtain throughput statistics for Ethernet frames transmitted under a given set of constraints that specify multiple payload sizes for the Ethernet frames;
  sending a request to collect data related to the Ethernet frames received at a network element under the given set of constraints;
  receiving the collected data from the network element in response to the request, wherein the collected data includes a detected number of the Ethernet frames corresponding to each of the multiple payload sizes;
  determining Ethernet frame statistics based on the collected data; and
  forwarding the collected data, the Ethernet frame statistics, and predetermined Ethernet frame information to the client, wherein the predetermined Ethernet frame information indicates:
    an amount of overhead for an Ethernet frame not having a virtual local area network (VLAN) tag, and
    a number of bytes, of a tagged Ethernet frame, not including a preamble and a start frame delimiter (SFD).

2. The method of claim 1, wherein the collected data comprises:
  a percentage of bandwidth used for carrying data via the Ethernet frames;
  a maximum rate at which the Ethernet frames can be transmitted in a channel; and
  a percentage of bandwidth used for carrying portions of the Ethernet frames, wherein the portions exclude the preamble and SFD.

3. The method of claim 1, wherein the given set of constraints further specify:
  a port identifier; and
  a virtual local area network (VLAN).

4. The method of claim 1, further comprising:
  scheduling, by the network element, a session for monitoring the Ethernet frames.

5. The method of claim 1, wherein the network element includes at least one of:
a user to network interface (UNI); or
a network to network interface (NNI).

6. The method of claim 5, wherein the UNI includes:
a customer edge (CE) device; or
a network interface device (NID).

7. The method of claim 1, wherein the request includes:
a request to collect the data related to a particular number of the Ethernet frames received by the network element.

8. The method of claim 1, wherein determining the Ethernet frame statistics based on the collected data includes determining at least one of:
a percentage of Ethernet frames for each of the multiple payload sizes;
a percentage of bytes, associated with the Ethernet frames for each of the multiple payload sizes, monitored by the network element; or
a total number of bytes of overhead associated with conveying data via the Ethernet frames.

9. The method of claim 1, further comprising:
monitoring Ethernet frames, at the network element.

10. A system comprising:
a network device configured to:
receive a first request, from a client device, to obtain throughput statistics for a particular number of Ethernet frames observed at a network element, wherein the request specifies multiple payload sizes for the Ethernet frames;
send a second request for Ethernet frame data related to the particular number of Ethernet frames observed at the network element;
receive the Ethernet frame data from the network element in response to the second request, wherein the Ethernet frame data includes a detected number of the Ethernet frames corresponding to each of the multiple payload sizes;
determine Ethernet frame statistics based on the received Ethernet frame data; and
forward the received Ethernet frame data, the Ethernet frame statistics, and predetermined Ethernet frame data to the client device, wherein the predetermined Ethernet frame data includes:
data indicating a number of bytes, of tagged Ethernet frames, not including preambles and start frame delimiters (SFDs), and
data indicating an amount of overhead bytes for Ethernet frames not having virtual local area network (VLAN) tags.

11. The system of claim 10, further comprising:
the network element, wherein the network element includes:
a user to network interface (UNI); or
a network to network interface (NNI).

12. The system of claim 11, wherein the UNI includes:
a customer edge (CE) device; or
a network interface device (NID).

13. The system of claim 10, wherein the first request further specifies:

a time for monitoring the particular number of Ethernet frames;
a source Media Access Controller (MAC) address; and
a destination Media Access Controller (MAC) address.

14. The system of claim 10, wherein the network element is configured to:
schedule a session for monitoring the particular number of Ethernet frames.

15. The system of claim 10, further comprising:
the client device, wherein the client device is configured to:
display the Ethernet frame data, the Ethernet frame statistics, and the predetermined Ethernet frame data.

16. A non-transitory computer-readable medium, comprising computer-executable instructions that, when executed by a processor, cause the processor to:
receive a first request, from a client, to obtain throughput statistics for Ethernet frames under a given set of constraints that specify multiple payload sizes for the Ethernet frames;
send a second request for Ethernet frame data related to a particular number of Ethernet frames observed at a network element under the given set of constraints;
receive the Ethernet frame data from the network element in response to the second request, wherein the collected data includes a detected number of the Ethernet frames corresponding to each of the multiple payload sizes;
determine Ethernet frame statistics based on the Ethernet frame data; and
forward the Ethernet frame data, the Ethernet frame statistics, and predetermined Ethernet frame information to the client, wherein the predetermined Ethernet frame information indicates:
an amount of overhead for an Ethernet frame not having a virtual local area network (VLAN) tag, and
a number of bytes, of a tagged Ethernet frame, not including a preamble and a start frame delimiter (SFD).

17. The non-transitory computer-readable medium of claim 16, wherein instructions further cause the processor to:
provide, for display, a percentage of bandwidth used for carrying data via the Ethernet frames;
provide, for display, a maximum rate at which the Ethernet frames can be transmitted in a channel; and
provide, for display, a percentage of bandwidth used for carrying portions of the Ethernet frames, wherein the portions exclude a preamble and a start frame delimiter.

18. The non-transitory computer-readable medium of claim 16, wherein instructions further cause the processor to:
schedule, based on the given set of constraints, a session for monitoring the particular number of Ethernet frames.

19. The non-transitory computer-readable medium of claim 16, wherein the given set of constraints further specify a port identifier for a node associated with conveying the particular number of Ethernet frames.

20. The non-transitory computer-readable medium of claim 16, wherein the given set of constraints further specify a virtual local area network (VLAN) identifier.

* * * * *